US009762661B1

(12) United States Patent
Kaplan et al.

(10) Patent No.: US 9,762,661 B1
(45) Date of Patent: Sep. 12, 2017

(54) MANAGING NETWORKS IN A VIRTUALIZATION SYSTEM

(71) Applicant: Red Hat Israel, Ltd., Raanana (IL)

(72) Inventors: Alona Kaplan, Raanana (IL); Michael Kolesnik, Raanana (IL)

(73) Assignee: Red Hat Israel, Ltd., Raanana (IL)

( * ) Notice: Subject to any disclaimer, the term of this patent is extended or adjusted under 35 U.S.C. 154(b) by 0 days.

(21) Appl. No.: 15/273,085

(22) Filed: Sep. 22, 2016

(51) Int. Cl.
*H04L 12/24* (2006.01)
*G06F 9/455* (2006.01)
*H04L 29/08* (2006.01)

(52) U.S. Cl.
CPC ...... *H04L 67/1034* (2013.01); *H04L 41/5003* (2013.01); *H04L 67/34* (2013.01)

(58) Field of Classification Search
CPC . H04L 67/1034; H04L 41/5003; H04L 67/34; H04L 12/4641; H04L 41/0806
USPC ........................................................ 709/223
See application file for complete search history.

(56) References Cited

U.S. PATENT DOCUMENTS

| | | | |
|---|---|---|---|
| 7,970,938 B1* | 6/2011 | Lambeth | ............ H04L 12/4641 709/206 |
| 8,375,117 B2 | 2/2013 | Venable | |
| 8,775,594 B2 | 7/2014 | Koponen et al. | |
| 8,964,598 B2 | 2/2015 | Casado et al. | |
| 9,071,530 B2 | 6/2015 | Venable, Sr. | |
| 9,077,611 B2 | 7/2015 | Cordray et al. | |
| 9,137,107 B2 | 9/2015 | Koponen et al. | |
| 9,172,663 B2 | 10/2015 | Casado et al. | |
| 2005/0114507 A1* | 5/2005 | Tarui | ................. H04L 29/12264 709/224 |
| 2009/0106404 A1* | 4/2009 | Christenson | ...... H04L 29/12952 709/222 |
| 2013/0272165 A1* | 10/2013 | Subramanian | ...... H04L 12/4641 370/254 |

OTHER PUBLICATIONS

Comodo Help, "Comodo Endpoint Security Manager," 2 pages, retrieved May 27, 2016.
Teq Diligent Product Solutions, "Multiport Unmanaged Network Switch Design," 5 pages, 2012-2014.
Hewlett-Packard, "Managing Your Network with HP OpenView Network Node Manager," 658 pages, 2001.

* cited by examiner

*Primary Examiner* — Tu Nguyen
(74) *Attorney, Agent, or Firm* — Lowenstein Sandler LLP (57) ABSTRACT

A mechanism for managed networks in a virtualization system is disclosed. A method of implementation of the disclosure includes detecting a configuration change in a first host associated with a data center managed by a virtualization management platform. The method may include identifying a first network associated with the first host. The method may include identifying a first set of network properties characterizing the first network. The method may include responsive to failing to identify, among a plurality of networks of the data center, a second network having a set of network properties matching the first set of network properties, defining a new logical network having the first set of network properties.

20 Claims, 7 Drawing Sheets

MANAGING NETWORKS IN A VIRTUALIZATION SYSTEM

TECHNICAL FIELD

Aspects of the present disclosure are generally related to virtualization systems, and more particularly to a network management system (NMS) in a virtualization system.

BACKGROUND

Virtualization may be viewed as an abstraction of some physical components into logical objects in order to allow running various software modules, for example, multiple operating systems, concurrently and in isolation from other software modules, on one or more interconnected physical computer systems. Virtualization allows, for example, consolidating multiple physical servers into one physical server running multiple virtual machines in order to improve the hardware utilization rate. Virtualization may be achieved by the hardware and below the virtual machines.

A hypervisor may run directly on the server hardware without an operating system beneath it or as an application running under a traditional operating system. A hypervisor may abstract the physical layer and present this abstraction to virtual machines to use, by providing interfaces between the underlying hardware and virtual devices of virtual machines. Processor virtualization may be implemented by the hypervisor scheduling time slots on one or more physical processors for a virtual machine, rather than a virtual machine actually having a dedicated physical processor. Memory virtualization may be implemented by employing a page table (PT) which is a memory structure translating virtual memory addresses to physical memory addresses.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

A centrally managed distributed virtualized computer system may comprise a virtualization manager and a plurality of host computer systems that may be grouped into one or more clusters associated with one or more data centers.

"Data center" herein shall refer to the highest-level container for all physical and logical resources within a managed virtual environment, including clusters and hosts, network resources (such as logical networks and physical network interface cards (NICs)), and storage resources (such as storage domains). A data center may comprise multiple clusters, and each cluster may comprise multiple hosts. A data center may have multiple storage domains associated with it, and it may support multiple virtual machines on each of its hosts. A managed virtual environment may contain multiple data centers which may be managed from one or more administration portals.

"Host" herein shall refer to a physical server that runs one or more virtual machines. Hosts may be grouped into clusters.

"Cluster" herein shall refer to a logical grouping of hosts that share the same storage domains and have the same type of the central processing unit (CPU) (e.g., Intel or AMD). Each cluster in the managed virtual environment is associated with a data center, and each host in the managed virtual environment is associated with a cluster. Virtual machines may be allocated to any host in a cluster and may be migrated between the hosts.

"Logical network" herein shall refer to a named set of network properties in a data center. Logical networks group network traffic and communication between hosts, storage, and virtual machines by usage, type, and requirements. Logical networks allow both connectivity and segregation. Logical networks may be created for storage communication to optimize network traffic between hosts and storage domains, and/or for virtual machine group traffic. A logical network is a data center-level resource; creating a logical network in a data center makes the logical network available to the clusters in a data center.

"VLAN ID" herein shall refer to a header in a packet that identifies which virtual local area network (VLAN) in a distributed computing system the packet belongs to.

"MTU size" herein shall refer to a defined packet size for a maximum transmission unit (MTU) in a network. The packet size is the largest size packet that may be sent in a network "QoS value" herein shall refer to a value indicating an overall performance of a network. The overall performance may be determined using an error rate, a bit rate, a throughput, or a transmission delay of the network.

An "unmanaged" network is a network that is unknown to the virtualization manager, i.e., the virtualization manager cannot identify a network having the same set of network properties as the given network. In various illustrative examples, an unmanaged network may be introduced into a centrally managed distributed virtualized computer system by adding a new host (e.g., by host migration), by otherwise changing a host configuration, or due to a configuration error. An unmanaged network cannot be associated with any virtual machines, and thus may have a limited utility. Conventional virtual management platforms are often unable to identify unmanaged networks.

Aspects of the present disclosure overcome this and other deficiencies of various common implementations by providing systems and methods for creating logical networks associated with identified unmanaged networks. In accordance with one or more aspects of the present disclosure, the virtualization manager may detect a network configuration change in a host. Responsive to failing to identify, among the networks of the data center to which the affected host belongs, a network that has the same set of network properties as the affected network, the virtualization manager may define a new logical network having the matching set of network properties.

In an illustrative example, two or more hosts associated with the same unmanaged network may be added to a cluster. Responsive to correlating the unmanaged networks defined in two or more hosts by comparing their network properties, and thus determining that the unmanaged networks represent the same network, the virtualization manager may associate each of the detected unmanaged networks with the same logical network.

In certain implementations, the virtualization manager may scan the existing networks in an attempt to identify an existing logical network that has a set of network properties that matches the sets of network properties of two or more detected unmanaged networks. If such an existing logical network may be identified, the detected unmanaged networks may be associated with the identified existing logical network; otherwise, a new logical network may be created and associated with the detected unmanaged networks.

Various aspects of the above-referenced methods and systems are described in details herein below by way of examples, rather than by way of limitation.

Figure 1:
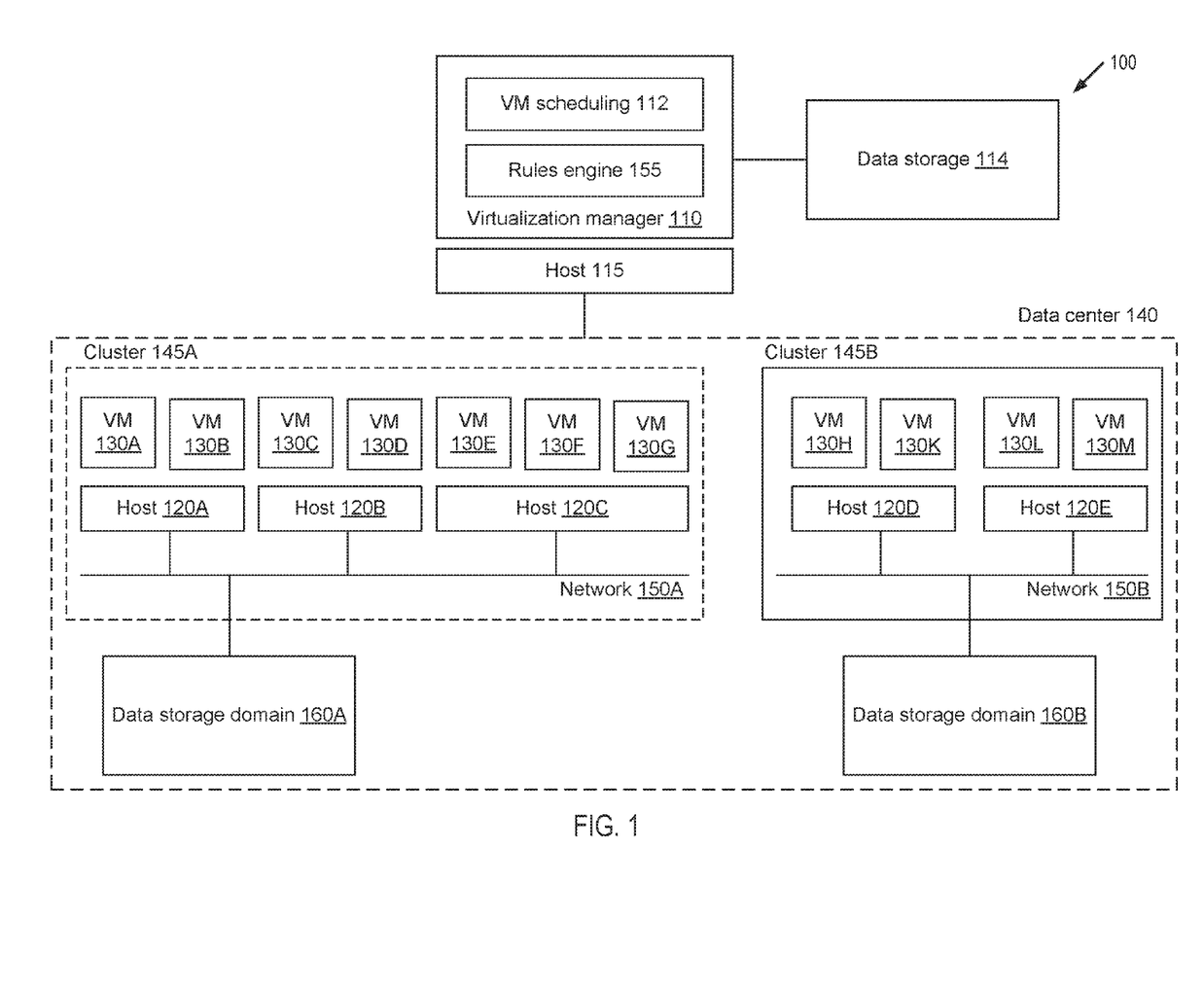
FIG. 1 depicts a high-level component diagram of one illustrative example of a distributed computer system representing a virtualized environment operating in accordance with one or more aspects of the present disclosure.

FIG. 1 depicts a high-level component diagram of one illustrative example of a distributed computer system 100 representing a virtualized environment. In the illustrative example of FIG. 1, distributed computer system 100 comprises a virtualization manager 110 and a plurality of host computer systems 120A-120E grouped into one or more clusters 145A-145B associated with a data center 140 that represents the highest level of abstraction in the virtualization model.

Virtualization manager 110 may comprise one or more software modules being executed by a host computer system 115 for centralized management of the virtualized environment. Virtualization manager 110 may comprise various interfaces, including administrative interface, reporting interface, and/or application programming interface (API) to communicate to host computers 120A-120E of the managed virtualized environment, as well as to user portals, databases, directory servers and various other components which are omitted from FIG. 1 for clarity.

The virtualization manager 110 may be communicatively coupled to a data store 114. The data store 114 may store network properties for the networks 150A and 150B in the distributed computer system 100. The network properties may include a virtual local area network (VLAN) identifier associated with network 150A or 150B, a maximum transmission unit (MTU) associated with a network 150A or 150B, or a quality of service (QoS) associated with network 150A or 150B, an internet protocol (IP) addresses of network 150A or 150B, a network identifier (ID) for network 150A or 150B, and so forth.

Each of host computer systems 115, 120A-120E may comprise one or more processing devices (CPUs) communicatively coupled to memory devices and input/output (110) devices, as described in more details herein below with references to FIG. 6.

Each of host computer systems 120A-120E may run a plurality of virtual machines 130A-130M, by executing a hypervisor to abstract the physical layer, including processors, memory, and I/O devices, and present this abstraction to the virtual machines as virtual devices. Each of hosting computer system 120A-120E may include one or more network entities. The network entities may be internet protocol (IP) interfaces, bridge interfaces, virtual local area network (VLAN) interfaces, network interface cards (NICs) bonds, or NICs. The hosting computer system 120A-120E may determine configuration information for the network entities. In one example, the configuration information may include information indicating a number or type of network entities in a network associated with the respective host computer systems 120A-120E and topology information of the network entities in the respective host computer systems 120A-120E. In another example, the configuration information may include attributes of the network entities, such as: a spanning tree protocol (STP), an attribute for a maximum transmission unit (MTU), an attribute indicating a speed of a network entity, a duplex attribute indicating when a network entity is in a duplex mode, and so forth.

A virtual machine 130 may execute a guest operating system which may utilize the underlying virtual devices, including virtual processors, virtual memory, and virtual I/O devices. One or more applications may be running on virtual machine 130 under the guest operating system.

Host computer systems of each cluster 145A-B may be communicatively coupled, via a network 150A-B, to one or more storage domains 160, including data storage domains 160A, 160B that store disk images of virtual machines 130.

In one implementation, the virtual machines 130A-130M, running on host computer system 115, may be connected to one logical network and managed by the virtualization manager 110. In another implementation, the virtual machines 130A-130M running on host computer system 115, may be within the multiple logical networks. For example, virtual machines 130A-130F may be connected a first logical network and virtual machines 130G-130M may be connected to a second logical network.

Host attributes may comprise the number and type of physical processors, the number and type of random access memory (RAM) capacity, physical storage capacity of the host, number and types of network interfaces of the host, number of virtual machines currently executing on the host, and processor and memory usage by the virtual machines. Virtual machine attributes may comprise the number and type of virtual processors, virtual memory capacity, number and types of virtual network interfaces, an identifier of the operating system image, and an identifier of the host on which the virtual machine is currently running.

Figure 2:
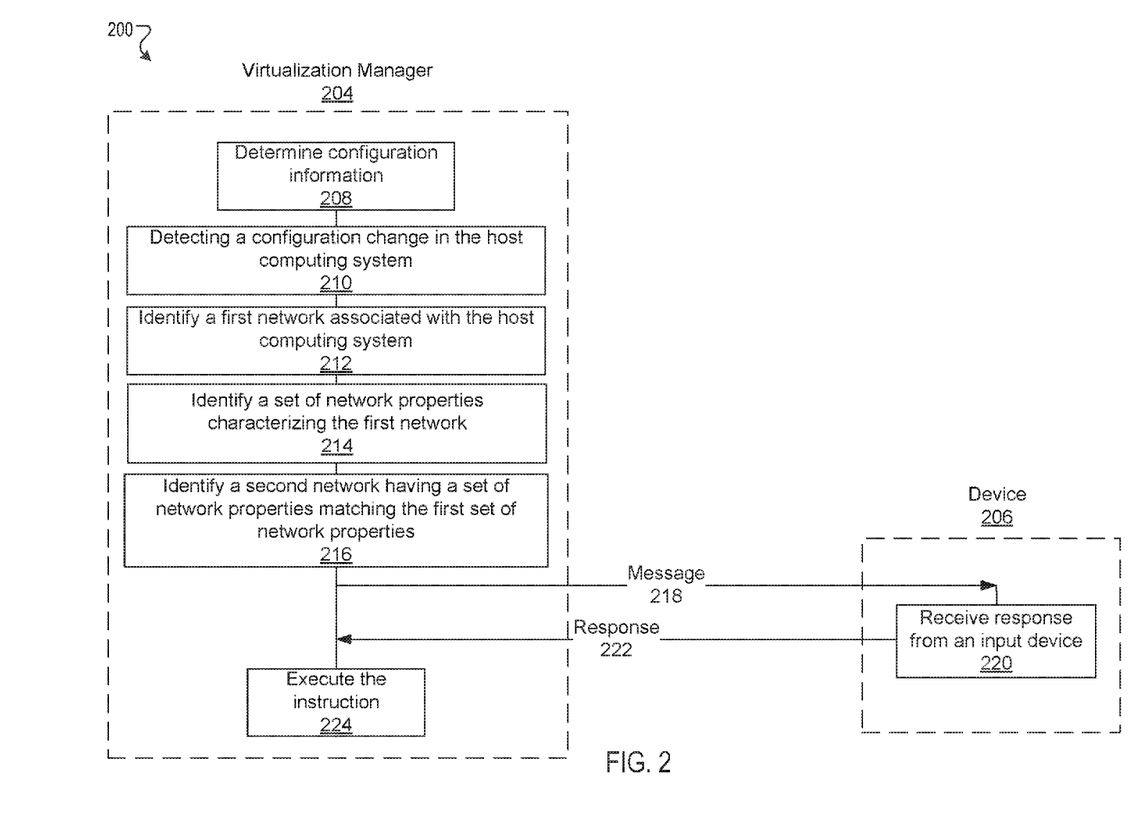
FIG. 2 illustrates a method for defining a network in a virtualization manager according to one example according to one example.

FIG. 2 illustrates a method 200 for defining a network in a virtualization manager 204 according to one example. The method 200 may at least partially be performed by processing logic that includes hardware (e.g., circuitry, dedicated logic, programmable logic, microcode, etc.), computer program components (e.g., instructions executed by a processing device), or a combination thereof. The method 200 may be performed by all or part of the distributed computer system 100 of FIG. 1. For example, the method 200 may be performed by the virtualization manager 110, the host computer systems 120A-120E, the clusters 145A-B, or the network 150A-B of FIG. 1.

Referring to FIG. 2, at block 208, the virtualization manager 204 may determine configuration information for network entities of a host computer system. The virtualization manager 204 can access and modify configurations of host computer systems. host computing system. At block 210, the virtualization manager 204 may detect a configuration change of the host computing system. The configuration change can include: network properties information for the host computing system being moved from a current data store to a new data store; switching a hypervisor of the host computer system 202 from an inactive mode to an active mode; switching the hypervisor of the host computer system 202 from a maintenance state to an active state; restarting the hypervisor; a power failure of the host computer system 202; a device (such as a system administrator device) changing a configuration of the host computer system 202; or a configuration change of a bridge or hypervisor of the host computer system 202.

At block 212, the virtualization manager 204 may identify a first network associated with the host computing system.

In one example, the virtualization manager 204 may search the data store to identify an entry for the host computing system. The entry may also include information identifying the first network. At block 214, the virtualization manager 204 may identify a first set of network properties characterizing the first network. The entry in the data store may also include the set of network properties characterizing the first network. At block 216, the virtualization manager 204 may identify a second network having a set of network properties matching the first set of network properties. For example, the data store may include a first network ID that correlates to the first network and a second network ID that correlates to the second network. The virtualization manager 204 may compare the first network ID to the second network ID. In another example, the virtualization manager 204 may query the data store to determine that the network properties for the first network match the network properties for the second network.

In one example, the virtualization manager 204 may perform a complete match between the network properties of the first network and the network properties of the second network. The complete match may be defined as all of the network properties of the first network matching all of the network properties of the managed network. The virtualization manager 204 may determine that the network properties for the first network match the network properties for the second network by sending packets (e.g., an Internet Control Message Protocol (ICMP) ping) between the first network and the second network. When the packet is sent from the first network arrives at the second network, there is a complete match between the first network and the second network. When the packet does not arrive at the second network, there is not a complete match between the first network and the second network. For example, the first network and the second network may be defined as two different logical networks within a network system. While the first network and the second network may be defined as two different logical networks, the first network and the second network may be the same logical network which is defined twice within the network system. When the second network receives the packets sent from the first network, the virtualization manager 204 may verify that the first network and the second network are the same logical network. When packets sent from the first network are not received at the second network, the virtualization manager 204 may not verify the first network and the second network are the same logical network. In one implementation, the first network and the second network may be different logical networks within the network system or communication protocols of the network system stopping the packets from being received at the second network.

In another example, the network properties of the first network and the second network may include essential network properties and non-essential network properties. The essential network properties may include MTU attributes and STP attributes. The non-essential network properties may include network speed properties (such as a bandwidth or latency of the network) and duplex properties (such as whether the network is configured for half-duplex data transmissions or full-duplex data transmissions). In this example, the virtualization manager 204 may match the essential network properties of the first network to the essential network properties of the second network.

In one example, in response to the matching of the network properties, the virtualization manager 204 may send a message to a device 206 (such as a device associated with a system administrator) requesting an instruction for managing the first network (218). For example, when the virtualization manager 204 identifies a match between the network properties of the first network and the network properties of the second network, the device 206 may display a graphical user interface (GUI) with a suggestion dialog box requesting a selection of a management instruction for the first network. The management instruction may include: changing the network ID for the first network to a network ID for the second network; defining the first network a new logical network having the first set of network properties; or reconfiguring the host computing system to eliminate the association between the first network and the host computing system. At block 220, the device 206 may receive a management instruction from the GUI.

The method may include the device 206 sending the response to the virtualization manager 204, where the response instructs the virtualization manager 204 to perform the instruction received at the device 206 via the GUI (222). At block 224, the virtualization manager 204 may execute the instruction. In one implementation, when the instruction instructs the virtualization manager 204 to add the first network to the distributed computer system 100, the virtualization manager 204 may define a new logical network in the data store, the new logical network having the first set of network properties.

In another implementation, when the instruction instructs the virtualization manager 204 to add the first network to the distributed computer system 100, a system administrator may manually add the network properties of the first network to the data store communicatively coupled to virtualization manager 204. For example, the system administrator may manually search through the networks in the distributed computer system 100 to identify a network that is not being managed by the virtualization manager 204. The system administrator may use the device 206 to send the virtualization manager 204 network properties for the first network. The virtualization manager 204 may store the network properties for the first network at the data store to define the new logical network in the distributed computer system 100. In another implementation, to enable the virtualization manager 204 to manage the first network, the virtualization manager 204 may change the first network ID for the first network to the second network ID for the second network.

In one implementation, the virtualization manager 204 may perform the instructions without having to receive the instruction from the device 206, e.g., automatically perform an instruction in view of a match between the network properties. For example, in response to identifying the matching network properties, the virtualization manager 204 may perform one or more predefined instructions. In one implementation, the instructions may be to add the network properties for the first network to the data store. In another implementation, the instructions may be a predefined process to change the first network ID to the second network ID for the first network in response to the virtualization manager 204 identifying the matching network properties.

Figure 3:
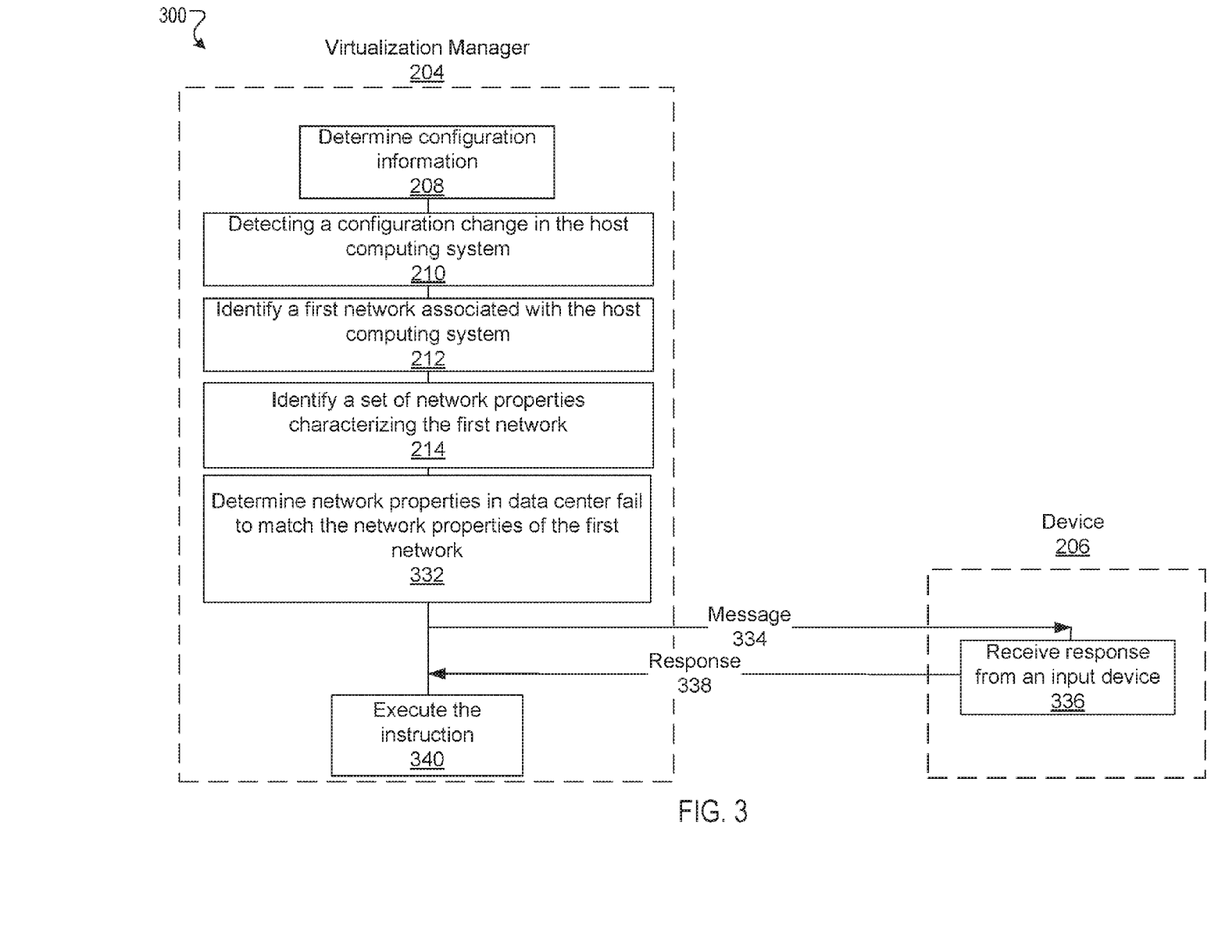
FIG. 3 illustrates a method for managing a network by a virtualization manager 204 according to one example according.

FIG. 3 illustrates a method 300 for managing a network by a virtualization manager 204 according to one example. The method 300 may at least partially be performed by processing logic that includes hardware (e.g., circuitry, dedicated logic, programmable logic, microcode, etc.), computer program components (e.g., instructions executed by a processing device), or a combination thereof. The method 300 may be performed by all or part of the distributed computer system 100 of FIG. 1. For example, the method 300 may be performed by the virtualization manager 110, the host computer systems 120A-120E, the clusters 145A-B, or the network 150A-B of FIG. 1. Some of the features in FIG. 3 are the same or similar to the some of the features in FIG. 2 as noted by same reference numbers, unless expressly described otherwise.

Referring to FIG. 3, blocks 208-214 of method 300 as the same as blocks 208-214 of method 200 in FIG. 2. Beginning with block 332 in FIG. 3, the method 300 may include the virtualization manager 204 determining that network properties in data center fail to match the network properties of the first network.

In response to failing to find a match for the network properties, the virtualization manager 204 may send a message to the device 206 requesting an instruction for managing the first network (334). For example, when the virtualization manager 204 does not identify a match between the network properties of the first network and the network properties of the second networks, the device 206 may display a graphical user interface (GUI) with a suggestion dialog box requesting a selection of a management option for managing the first network.

At block 336, the device 206 may receive a management instruction from the GUI, as discussed above. In one example, the management instruction may include defining a new logical network having the first set of network properties, as discussed above. In another example, the management instruction may include reconfiguring the first host computer system 202 to eliminate an association between the first network and the first host. The method may include the device 206 sending a response to the virtualization manager 204, where the response instructs the virtualization manager 204 to perform the instruction received at the device 206 via the GUI (338). At block 340, the virtualization manager 204 may execute the instruction. In one implementation, when the response instructs the virtualization manager 204 to add the first network to the virtualization manager 204, the virtualization manager 204 may add the configuration information for the first network to the data store communicatively coupled to the virtualization manager 204.

FIGS. 2 and 3 illustrating a single host computer system 202 in a distributed computer system are not intended to be limiting. The virtualization manager 204 may detect configuration changes in multiple host computer systems and may execute different instructions in view of the network properties of the multiple host computer system matching or not matching network properties in the data store. For example, the virtualization manager 204 can: detect a configuration change in a second host; identify a third network associated with the second host; identify a second set of network properties characterizing the third network; and responsive to determining that the second set of network properties matches the first set of network properties, associate the third network with a new logical network.

Figure 4:
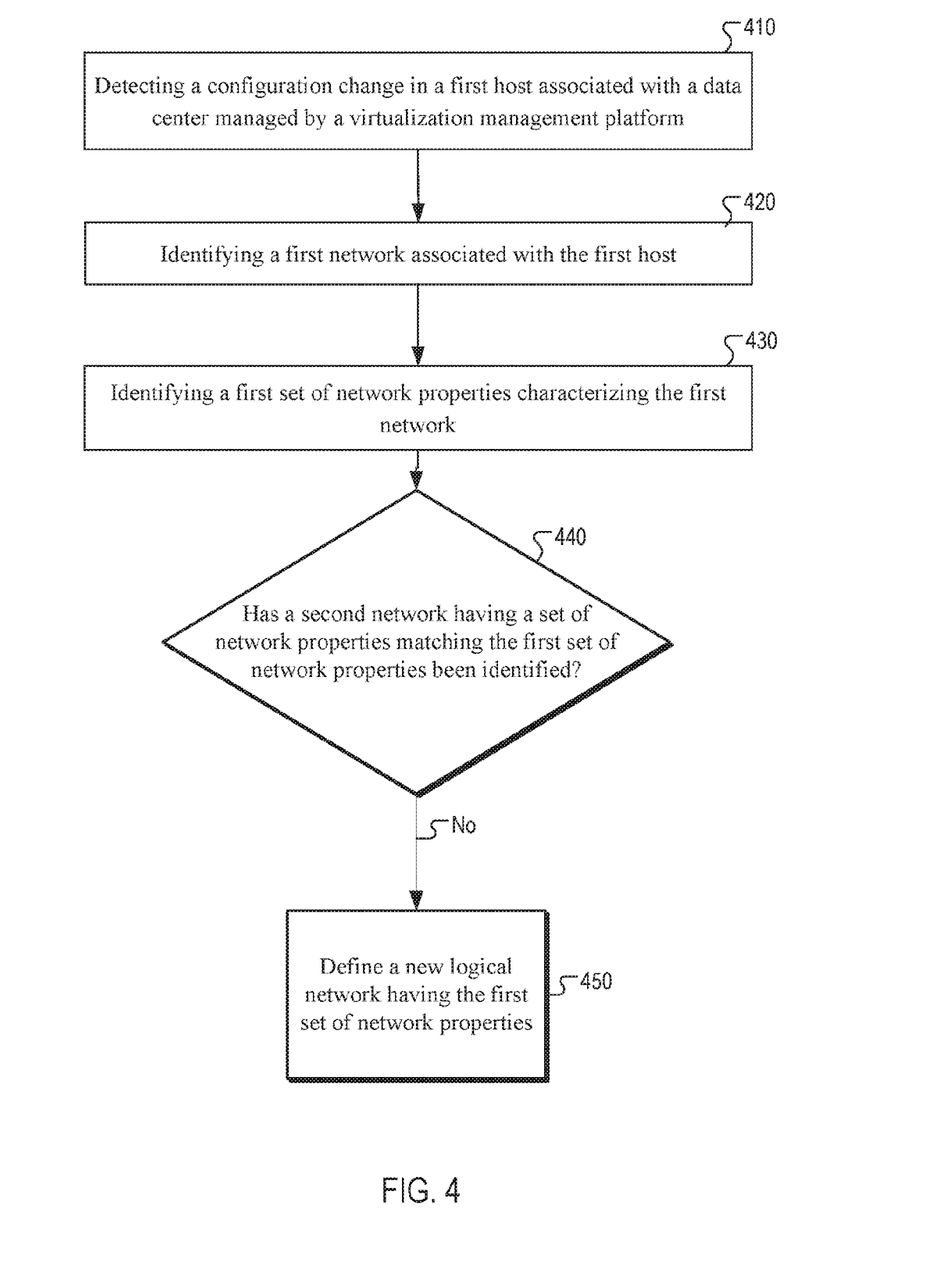
FIG. 4 depicts a flow diagram of one example of a method for defining a new logical network having a set of network properties according to one example.

FIG. 4 depicts a flow diagram of one example of a method 400 for defining a new logical network having a set of network properties according to one example. The method is performed by processing logic that may comprise hardware (circuitry, dedicated logic, etc.), computer programs (such as is run on a general-purpose computer system or a dedicated machine), or a combination of both. The method 400 may be performed in all or in part by the distributed computer system 100, the virtualization manager 110, the host computer systems 120A-120E, the clusters 145A-B, or the network 150A-B of FIG. 1.

At block 410, a processing device may detect a configuration change in a first host associated with a data center managed by a virtualization management platform. At block 420, the processing device may identify a first network associated with the first host. At block 430, the processing device may identify a first set of network properties characterizing the first network. At diamond 440, the processing device, may determine whether a second network with a set of network properties matching the first set of network properties been identified. At block 450, when the processing device determines that the second network with a set of network properties matching the first set of network properties has not been identified, the processing device can define a new logical network having the first set of network properties.

Figure 5:
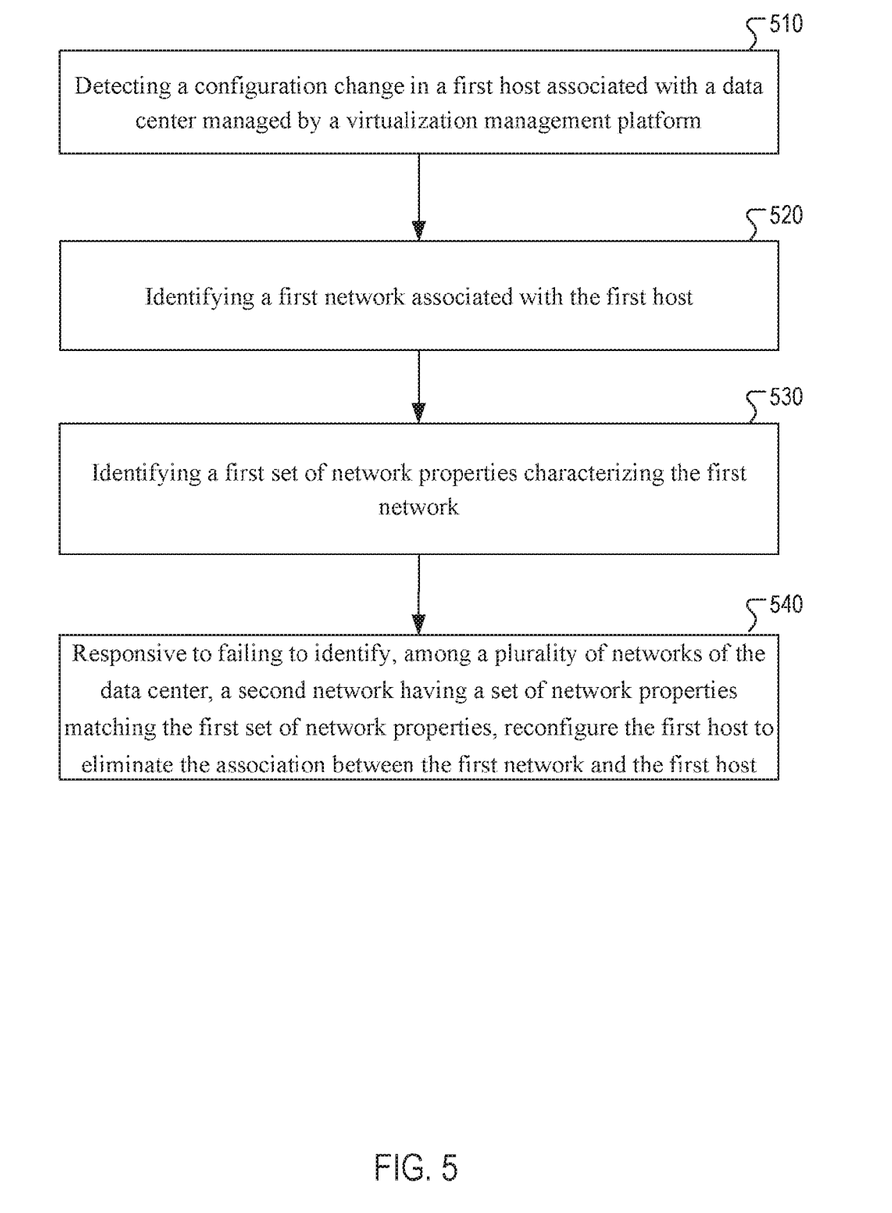
FIG. 5 depicts a flow diagram of one example of a method for removing a network from a distributed computing system according to one example.

FIG. 5 depicts a flow diagram of one example of a method 500 for removing a network from a distributed computing system according to one example. The method is performed by processing logic that may comprise hardware (circuitry, dedicated logic, etc.), computer programs (such as is run on a general-purpose computer system or a dedicated machine), or a combination of both. The method 500 may be performed in all or in part by the distributed computer system 100, the virtualization manager 110, the host computer systems 120A-120E, the clusters 145A-B, or the network 150A-B of FIG. 1.

At block 510, a processing device may detect a configuration change in a first host associated with a data center managed by a virtualization management platform. At block 520, the processing device may identify a first network associated with the first host. At block 530, the processing device may identify a first set of network properties characterizing the first network. At block 540, the processing device may, responsive to failing to identify, among a plurality of networks of the data center, a second network having a set of network properties matching the first set of network properties, reconfigure the first host to eliminate the association between the first network and the first host.

Figure 6:
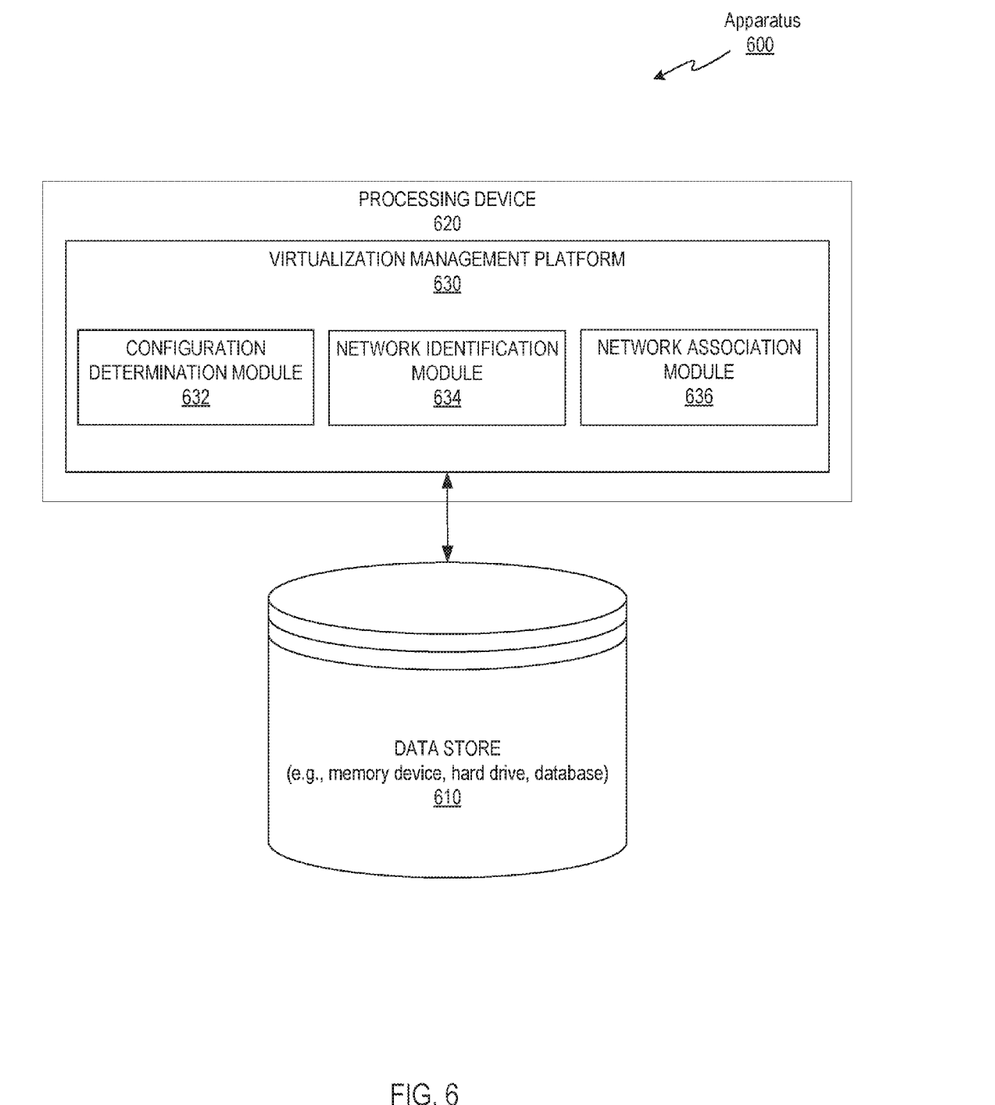
FIG. 6 illustrates an example apparatus in which implementations of the disclosure may operate.

FIG. 6 illustrates an example apparatus 600 in which implementations of the disclosure may operate. The apparatus 600 may be the same or similar to one of the distributed computer system 100, the virtualization manager 110, the host computer systems 120A-120E, the clusters 145A-B, or the network 150A-B, or other computing devices within the distributed computer system 100 of FIG. 1. The apparatus 600 may include a data store 610 that may store configuration change for hosts in a distributed computer system. The data store 610 may include any non-persistent data storage (e.g., memory), persistent data storage (e.g., flash storage, hard drive, tape), other medium, or combination thereof that is capable of storing instructions for carrying out the operations of the components and module discussed herein. The apparatus 600 may include components and modules for adding, removing, or modifying networks in the distributed computer system. The apparatus 600 may include a processing device 620 with a virtualization management platform 630. The virtualization management platform 630 may include a configuration determination module 632, a network identification module 634, and a network association module 636.

The configuration determination module 632 may detect a configuration change in a first host associated with the data center 610 managed by a virtualization management platform 630. The network identification module 634 may identify a first network associated with the first host. The network identification module 634 may identify a first set of network properties characterizing the first network. The network association module 636 may responsive to the identifying, among a plurality of networks of the data center 610, a second network having a set of network properties matching the first set of network properties, identify the first network as being equivalent to the second network.

Figure 7:
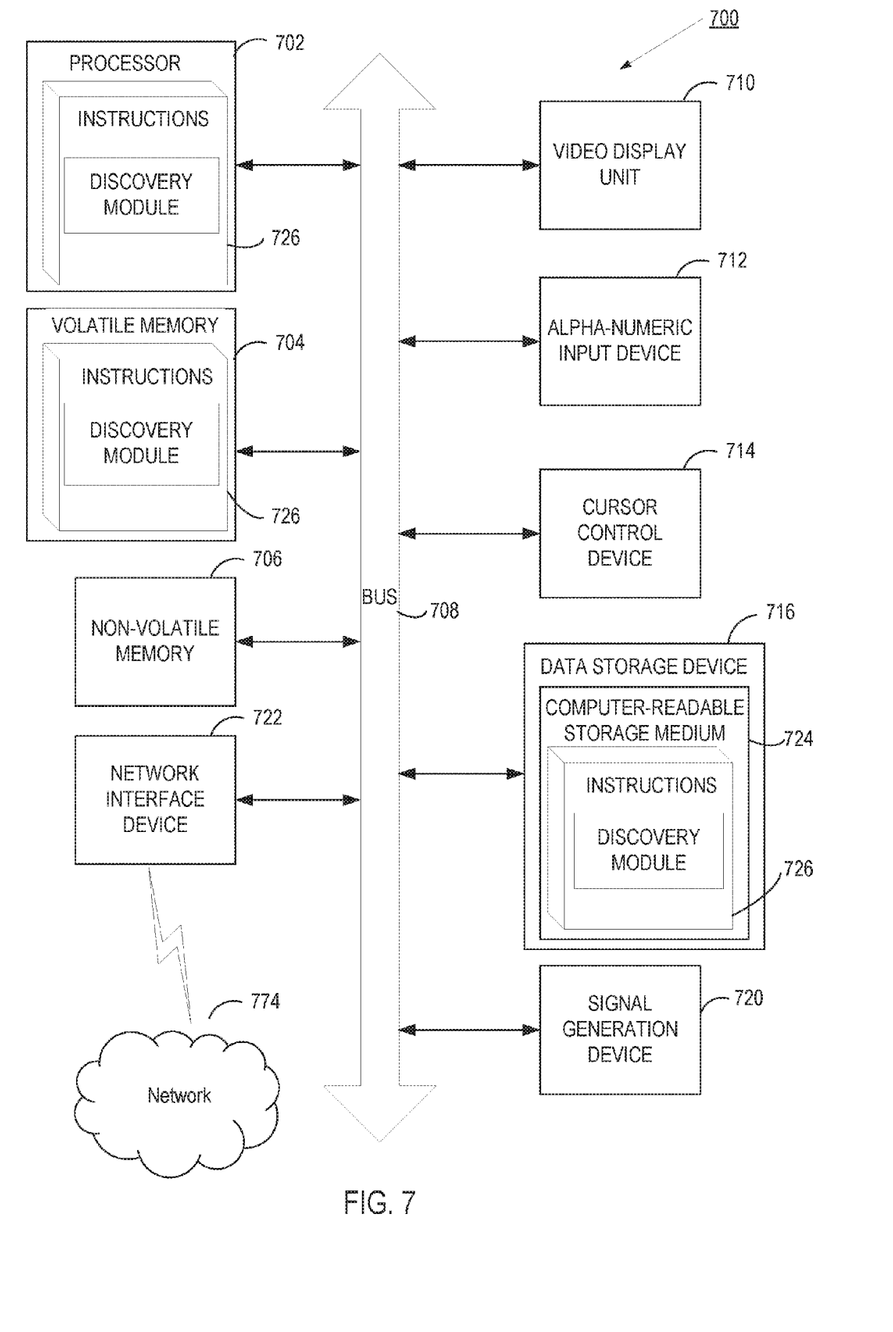
FIG. 7 depicts a block diagram of a computer system operating in accordance with one or more aspects of the present disclosure.

FIG. 7 depicts a block diagram of a computer system operating in accordance with one or more aspects of the present disclosure. In various illustrative examples, computer system 700 may correspond to one or more of the distributed computer system 100, the virtualization manager 110, the host computer systems 120A-120E, the clusters 145A-B, or the network 150A-B, or other computing devices within the distributed computer system 100 of FIG. 1.

In certain implementations, computer system 700 may be connected (e.g., via a network, such as a Local Area Network (LAN), an intranet, an extranet, or the Internet) to other computer systems. Computer system 700 may operate in the capacity of a server or a client computer in a client-server environment, or as a peer computer in a peer-to-peer or distributed network environment. Computer system 700 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 700 may include a processor 702, a volatile memory 704 (e.g., random access memory (RAM)), a non-volatile memory 706 (e.g., read-only memory (ROM) or electrically-erasable programmable ROM (EEPROM)), and a data storage device 716, which may communicate with each other via a bus 708.

Processor 702 may be provided by one or more processing devices such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field-programmable gate array (FPGA), a digital signal processor (DSP), or a network processor).

Computer system 700 may further include a network interface device 722. Computer system 700 also may include a video display unit 710 (e.g., an LCD), an alphanumeric input device 712 (e.g., a keyboard), a cursor control device 714 (e.g., a mouse), and a signal generation device 720.

Data storage device 716 may include a non-transitory computer-readable storage medium 724 on which may store instructions 726 encoding any one or more of the methods or functions described herein, including instructions for implementing methods 200, 230, 300, and 400.

Instructions 726 may also reside, completely or partially, within volatile memory 704 and/or within processor 702 during execution thereof by computer system 700, hence, volatile memory 704 and processor 702 may also constitute machine-readable storage media.

While computer-readable storage medium 724 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that causes the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated into the functionality of other hardware components such as ASICS, FPGAs, DSPs or similar devices. In addition, the methods, components, and features may be implemented by computer program modules or functional circuitry within hardware devices. Further, the methods, components, and features may be implemented in any combination of hardware devices and computer program components, or only in computer programs.

Unless specifically stated otherwise, terms such as "loading," "transmitting," "receiving," "overwriting," "initiating," "discovering," "analyzing," or the like, refer to actions and processes performed or implemented by computer systems that manipulate and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general-purpose computer system selectively programmed by a computer program stored in the computer system. Such a computer program may be stored in a computer-readable tangible storage medium.

The methods and illustrative examples described herein are not inherently related to any particular computer or other apparatus. Various general-purpose systems may be used in accordance with the teachings described herein, or it may prove convenient to construct more specialized apparatus to perform methods 200, 300, 400, and 500 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
   detecting, by a processing device to execute a virtualization manager, a configuration change in a first host associated with a data center managed by a virtualization management platform;
   identifying, by the processing device to execute the virtualization manager, a first network associated with the first host;
   identifying, by the processing device to execute the virtualization manager, a first set of network properties characterizing the first network;
   responsive to failing to identify, among a plurality of networks of the data center, a second network having a set of network properties matching, by the processing device to execute the virtualization manager, the first set of network properties, defining a new logical network having the first set of network properties;
   sending, by the processing device to execute the virtualization manager, a message to a device requesting an instruction for managing the first network; and
   receiving a response from the device, where the response instructs the virtualization manager to perform the instruction received at the device via a graphical user interface.

2. The method of claim 1, wherein the first set of network properties comprises at least one of: a virtual local area network (VLAN) identifier associated with the first network, a maximum transmission unit (MTU) size associated with the first network, or a quality of service (QoS) class identifier associated with the first network.

3. The method of claim 1, further comprising:
   detecting a configuration change in a second host;
   identifying a third network associated with the second host;
   identifying a second set of network properties characterizing the third network; and
   responsive to determining that the second set of network properties matches the first set of network properties, associating the third network with the new logical network.

4. The method of claim 1, further comprising:
   responsive to identifying, among the plurality of networks of the data center, an existing logical network having a set of network properties matching the first set of network properties, associating the first network with the existing logical network.

5. The method of claim 1, wherein the first set of network properties comprise:
   essential network properties comprising one or more of a maximum transmission unit (MTU) size of the network or a spanning tree protocol (STP) attribute of the network; and
   non-essential network properties comprising one or more of a speed attribute or the network or a duplex attribute of the network.

6. The method of claim 5, further comprising, responsive to failing to identify, among the plurality of networks of the data center, the second network having a set of essential network properties matching essential network properties of the first set of network properties, defining the new logical network having the first set of network properties.

7. The method of claim 1, wherein the network properties comprises at least one of: an internet protocol (IP) addresses of the first network and a network identifier of the first network.

8. The method of claim 1, wherein the new logical network is defined in the data center.

9. An apparatus comprising:
   a memory;
   a processing device operatively coupled to the memory, wherein the processing device is to:
      detect a configuration change in a first host associated with a data center managed by a virtualization management platform;
      identify a first network associated with the first host;
      identify a first set of network properties characterizing the first network;
      responsive to the identifying, among a plurality of networks of the data center, a second network having a set of network properties matching the first set of network properties, identify the first network as being equivalent to the second network;
      send a message to a device requesting an instruction for managing the first network; and
      receive a response from the device, where the response instructs the virtualization manager to perform the instruction received at the device via a graphical user interface.

10. The apparatus of claim 9, wherein identify the first network as being equivalent to the second network further comprises:
    change a first network identifier for the first network to a second network identifier associated with the second network in the data center.

11. The apparatus of claim 9, wherein the network properties comprises at least one of: an internet protocol (IP) addresses of the first network and a network identifier of the first network.

12. The apparatus of claim 9, wherein the virtualization manager is an application executed by another processing device that manages scheduling time slots on one or more physical processors of one or more hosts in the plurality of networks of the data center.

13. The apparatus of claim 9, wherein the first set of network properties comprises at least one of: a virtual local area network (VLAN) identifier associated with the network, a maximum transmission unit (MTU) associated with the network, or a quality of service (QoS) associated with the network.

14. The apparatus of claim 9, wherein the processing device is further to:
    detect a configuration change in a second host;
    identify a third network associated with the second host;
    identify a second set of network properties characterizing the third network; and
    responsive to determining that the second set of network properties matches the first set of network properties, associate the third network with the second network in the data center.

15. The apparatus of claim 9, wherein the first set of network properties comprise:
    essential network properties comprising one or more of a maximum transmission unit (MTU) size of the network or a spanning tree protocol (STP) attribute of the network; and
    non-essential network properties comprising one or more of a speed attribute of the network or a duplex attribute of the network.

16. The apparatus of claim 15, wherein the processing device is further to:
    responsive to failing to identify, among the plurality of networks of the data center, the second network having a set of essential network properties matching essential network properties of the first set of network properties, define a new logical network having the first set of network properties.

17. A non-transitory computer-readable storage medium, having instructions stored therein, which when executed, cause a processing device to:
 detect, by the processing device to execute a virtualization manager, a configuration change in a first host associated with a data center managed by a virtualization management platform;
 identify, by the processing device to execute the virtualization manager, a first network associated with the first host;
 identify, by the processing device to execute the virtualization manager, a first set of network properties characterizing the first network;
 responsive to failing to identify, among a plurality of networks of the data center, a second network having a set of network properties match, by the processing device to execute the virtualization manager, the first set of network properties, reconfiguring the first host to eliminate the association between the first network and the first host;
 send, by the processing device to execute the virtualization manager, a message to a device requesting an instruction for managing the first network; and
 receive a response from the device, where the response instructs the virtualization manager to perform the instruction received at the device via a graphical user interface.

18. The non-transitory computer-readable storage medium of claim 17, further comprising instructions, which when executed, cause the processing device is to:
 detect a configuration change in a second host;
 identify a third network associated with the second host;
 identify a second set of network properties characterizing the third network; and
 responsive to determining that the second set of network properties matches the first set of network properties, associate the third network with a new logical network.

19. The non-transitory computer-readable storage medium of claim 17, further comprising instructions, which when executed, cause the processing device is to:
 detect a configuration change in a second host;
 identify a third network associated with the second host;
 identify a second set of network properties characterizing the third network; and
 responsive to determining that the second set of network properties matches the first set of network properties, associate the third network with the second network in the data center.

20. The non-transitory computer-readable storage medium of claim 17, wherein the first set of network properties comprises at least one of: a virtual local area network (VLAN) identifier associated with the network, a maximum transmission unit (MTU) associated with the network, or a quality of service (QoS) associated with the network.

* * * * *